(12) United States Patent
Wang et al.

(10) Patent No.: US 9,042,601 B2
(45) Date of Patent: May 26, 2015

(54) SELECTIVE MAX-POOLING FOR OBJECT DETECTION

(71) Applicant: NEC Laboratories America, Inc., Princeton, NJ (US)

(72) Inventors: Xiaoyu Wang, Sunnyvale, CA (US); Shenghuo Zhu, Santa Clara, CA (US); Ming Yang, Sunnyvale, CA (US); Yuanqing Lin, Sunnyvale, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 52 days.

(21) Appl. No.: 14/108,295

(22) Filed: Dec. 16, 2013

(65) Prior Publication Data
US 2014/0270367 A1    Sep. 18, 2014

Related U.S. Application Data

(60) Provisional application No. 61/783,820, filed on Mar. 14, 2013.

(51) Int. Cl.
*G06K 9/00*    (2006.01)
*G06K 9/66*    (2006.01)

(52) U.S. Cl.
CPC ........................................ *G06K 9/66* (2013.01)

(58) Field of Classification Search
CPC . G06K 9/6267; G06K 9/6257; G06K 9/6212; G06K 9/6218; G06K 9/6202; G06K 9/4642; G06K 9/6211; G06K 2009/6213; G06K 9/66
See application file for complete search history.

(56) References Cited

U.S. PATENT DOCUMENTS

| | | | |
|---|---|---|---|
| 2009/0290798 A1* | 11/2009 | Sakai et al. | 382/195 |
| 2012/0163706 A1* | 6/2012 | Zhang et al. | 382/159 |
| 2014/0085475 A1* | 3/2014 | Bhanu et al. | 348/148 |
| 2014/0153781 A1* | 6/2014 | Suh et al. | 382/103 |

\* cited by examiner

*Primary Examiner* — Brian Le
(74) *Attorney, Agent, or Firm* — Joseph Kolodka

(57) ABSTRACT

Systems and methods are disclosed for object detection by receiving an image and extracting features therefrom; applying a learning process to determine sub-regions and select predetermined pooling regions; and performing selective max-pooling to choose one or more feature regions without noises.

15 Claims, 6 Drawing Sheets

SELECTIVE MAX-POOLING FOR OBJECT DETECTION

This application is a utility conversion and claims priority to Provisional Application Ser. 61/783,820 filed Mar. 14, 2013, the content of which is incorporated by reference.

BACKGROUND

The present invention relates to Selective Max-Pooling For Object Detection.

Generic object detection is confronted by dealing with different degrees of variations in distinct object classes with tractable computations, which demands for descriptive and flexible object representations that are also efficient to evaluate for many locations.

Despite the success of face detection where the target objects are roughly rigid, generic object detection remains an open problem mainly due to the challenge of handling all possible variations with tractable computations. In particular, different object classes demonstrate a variable degree of deformation in images, either due to their nature, e.g., living creatures like cats are generally more deformable than manmade objects like vehicles, or due to viewing distances or angles, e.g., deformable objects may appear somehow rigid at a distance and even rigid objects may show larger variations in different view angles. These pose a fundamental dilemma to object class representations: on one hand, a delicate model describing rigid object appearances may hardly handle deformable objects; on the other hand, a high tolerance of deformation may result in imprecise localization or false positives for rigid objects.

Conventional object detection systems cope with object deformation efficiently with primarily three typical strategies. First, if spatial layouts of object appearances are roughly rigid such as faces or pedestrians at a distance, the classical Adaboost detection mainly tackles local variations with an ensemble classifier of efficient features. Then a sliding window search with cascaded classifiers is an effective way to achieve precise and efficient localization. Second, the deformable part model (DPM) method inherits the HOG window template matching but explicitly models deformations by latent variables, where an exhaustive search of possible locations, scales, and aspect ratios are critical to localize objects. Later on, the DPM has been accelerated by coarse-to-fine search, branch and bound, and cross-talk approaches. Third, object recognition methods using spatial pyramid matching (SPM) of bag-of-words (BoW) models are adopted for detection, and they inherently can tolerate large deformations. These sophisticated detectors are applied to thousands of object-independent candidate regions, instead of millions of sliding windows. In return, little modeling of local spatial appearances leaves these recognition classifiers unable to localize rigid objects precisely, e.g., bottles. These successful detection approaches inspire us to investigate a descriptive and flexible object representation, which delivers the modeling capacity for both rigid and deformable objects in a unified framework.

Features are arguably the most important part of a recognition system. A feature appearing at position "A" in one detection region could be located at position "b" in another. The proposed approach focuses on improving the robustness of features for general object detection. Previous arts solve this problem by using larger feature extraction regions. However, it will also include more non-relevant noises which put a heavy burden on the learning process.

SUMMARY

Systems and methods are disclosed for object detection by receiving an image and extracting features therefrom; applying a learning process to determine sub-regions and select predetermined pooling regions; and performing selective max-pooling to choose one or more feature regions without noises.

Advantages of the preferred embodiments may include one or more of the following. Instead of using a big region to cover features in different possible positions, the system pools features in different locations. Features appearing in either candidate sub-regions will be counted. It's impossible to manually determine sub-regions used for pooling, so a learning process automatically selects useful pooling regions. The system offers a number of additional advantages: 1) It introduces the regionlet concept which is flexible to extract features from arbitrary bounding boxes. 2) The regionlet-based representation for an object class, which not only models relative spatial layouts inside an object but also accommodates variations especially deformations by the regionlet group selection in boosting and the aggregation of feature responses in a regionlet group. As validated in the experiment, the proposed representation adaptively models a varying degree of deformation in diverse object classes. In this manner, regionlets provide a radically different way to model object deformation compared to existing BoW approaches with selective search and DPM approaches. Our regionlet model can well adapt itself for detecting rigid objects, objects with small local deformations as well as long-range deformations. Validated on the challenging PASCAL VOC datasets and ImageNet object detection dataset, the proposed regionlet approach demonstrates superior performance compared to the existing approaches. We contemplate using bounding boxes in term of recall and speed. We also contemplate that context information can be integrated into the boosting learning process for further improving detection performance.

DESCRIPTION

Object detection is composed of two key components: determining where the candidate locations are in images and discerning whether they are the objects of interests. Beyond the straightforward exhaustive search of all locations, our regionlet detection approach screens the candidate windows derived from the selective search. For selective search, given an image, it first over-segments the image into superpixels, and then those superpixels are grouped in a bottom-up manner to propose candidate bounding boxes. Such proposing bounding boxes, about 1,000:2,000 each image, achieve very high recall. After this, the task of detection boils down to extraction of an appropriate object representation on each proposed box and learning of a scoring function to rank the boxes. To that end, we introduce regionlet features for each candidate bounding box. In our proposed method, we construct a largely over-complete regionlet feature pool and then design a cascaded boosting learning process to select the most discriminative regionlets for detection.

In object detection, an object category is essentially defined by a classifier where both object appearance and the spatial layout inside an object shall be taken into account. For simplicity, appearance features are mostly extracted from some rectangular sub-regions within an object, which we refer as feature extraction regions herein. Features extracted from a small region often provide a good localization ability, but are vulnerable to variations; a big region tends to tolerate more variations but may not be sensitive enough for accurate localization. When large variations especially deformations occur, a large rectangle region may not be appropriate for extracting descriptive features of an object. Because some parts or the regions may not be informative or even distractive. This motivates us to define sub-parts of a region, i.e., the regionlets, as the basic units to extract appearance features, and organize them into small groups which are more flexible to describe distinct object categories with different degrees of deformation.

Figure 1:
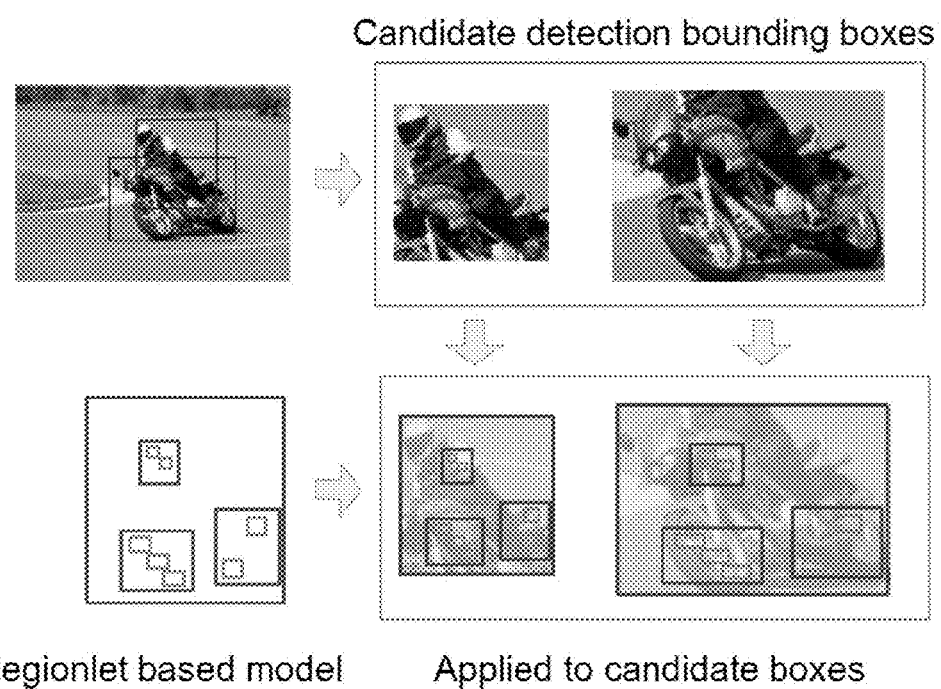
FIG. 1 shows an exemplary illustration of a regionlet representation.

FIG. 1 shows an exemplary illustration of a regionlet representation. Regionlet representation can be applied to candidate bounding boxes that have different sizes and aspect ratios. A regionlet-based model is composed of a number of regions (denoted by blue rectangles), and then each region is represented by a group of regionlets (denoted by the small orange rectangles inside each region). In FIG. 1, the regionlets drawn as orange boxes are grouped within blue rectangular regions. The regionlets and their groups for one object class are learned in boosting with stable relative positions to each other. When they are applied to two candidate bounding boxes, the feature responses of regionlets are obtained at their respective scales and aspect ratios without enumerating all possible spatial configurations.

Figure 2:
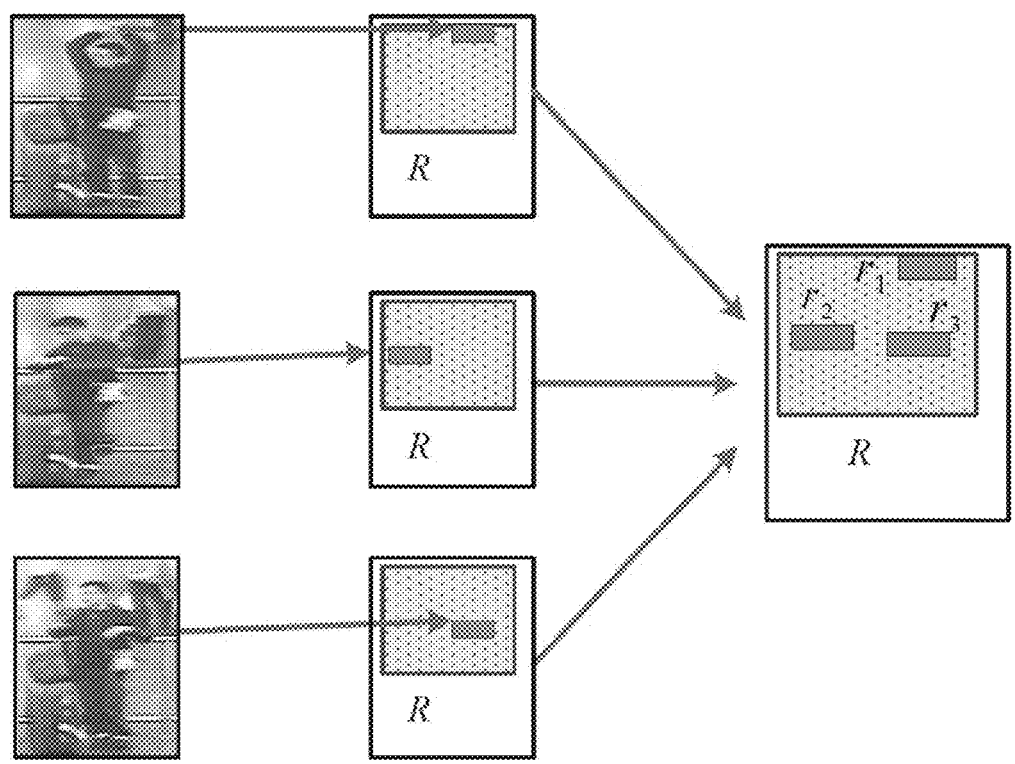
FIG. 2 shows an exemplary illustration of the relationship among a detection bounding box, a feature extraction region and regionlets.

FIG. 2 illustrates an exemplary relationship among a detection bounding box, a feature extraction region and regionlets. A feature extraction region R, shown as a light blue rectangle, is cropped from a fixed position from 3 samples of a person. Inside R, several small sub-regions denoted as $r_1$, $r_2$ and $r_3$ (in orange small rectangules) are the regionlets to capture the possible locations of the hand for person detection.

We would like to introduce the regionlets with an example illustrated in FIG. 2. The first column in FIG. 2 shows three samples of a person that are the target object to detect and they are cropped by black bounding boxes in the second column. A rectangle feature extraction region inside the bounding box is denoted as R, which will contribute a weak classifier to the boosting classifier. Within this region R, we further spot some small sub-regions (e.g., $r_1$, $r_2$ and $r_3$) and define them as a group of regionlets. We employ the term regionlet, because the features of these sub-regions will be aggregated to a single feature for R, and they are below the level of a standalone feature extraction region in an object classifier. In short, in the proposed method, a detection bounding box is represented by a number of regions, each of which is composed of a small set of regionlets.

This example also illustrates how regionlets are designed to handle deformation. Hand, as a supposingly informative part for a person, may appear at different locations within the bounding box of a person. If we extract the feature for a hand from the whole region R which roughly covers the possible locations of the hand, the appearance of some non-hand regions on the torso or background clearly are also included in the feature. An ideal deformation handling strategy is to extract features only from the hand region in all three cases. To that end, we introduce three regionlets inside R (In general, a region can contain many regionlets. Here "three" is mainly for illustration purpose). Each regionlet r covers a possible location of hand. Then only features from the regionlets are extracted and aggregated to generate a compact representation for R. Irrelevant appearance from backgrounds are largely discarded. More regionlets in R will increase the capacity to model deformations, e.g., hand surely may appear in more positions than three. On the other hand, rigid objects may only require one regionlet from a feature extraction region.

Feature extraction from R takes two steps: 1) extracting appearance features, e.g., the HOG and LBP descriptors from each regionlet respectively; and 2) generating the representation of R based on regionlets' features. The first step is straightforward. For the second step, we define a permutation invariant feature operation on features extracted from regionlets, and such an operation also assumes an exclusive relation among regionlets. Let's denote T (R) as the feature representation for region R, $T(r_j)$ as the feature extracted from the $j^{th}$ regionlet $r_j$ in R, then the operation is defined as following:

$$T(R) = \sum_{j=1}^{N_R} \alpha_j T(r_j), \tag{1}$$

$$\text{subject to } \alpha_j \in \{0, 1\}, \sum_{j=1}^{N_R} \alpha_j = 1,$$

where $N_R$ is the total number of regionlets in region R, $\alpha_j$ is a binary variable, either 0 or 1. This operation is permutation invariant, namely, the occurrence of the appearance cues in any of regionlets is equivalent, which allows deformations among these regionlet locations. The operation also assumes the exclusiveness within a group of regionlets, namely, one and only one regionlet will contribute to the region feature representation. The exclusive assumption is that when deformation occurs, the discriminative sub-region appears at only one position in a specific training/testing sample.

In our framework, we simply apply max-pooling over regionlet features. So Eq. 1 is instantiated as:

$$T(R) = \max_j T(r_j). \tag{2}$$

The max-pooling happens for each feature dimension independently. For each regionlet $r_j$, we first extract low-level feature vectors, such as HOG or LBP histograms. Then, we pick a 1D feature from the same dimension of these feature vectors in each regionlet and apply Eq. 2 to form the feature for region R. We have millions of such 1D features in a detection window and the most discriminative ones are determined through a boosting type learning process.

Figure 3:
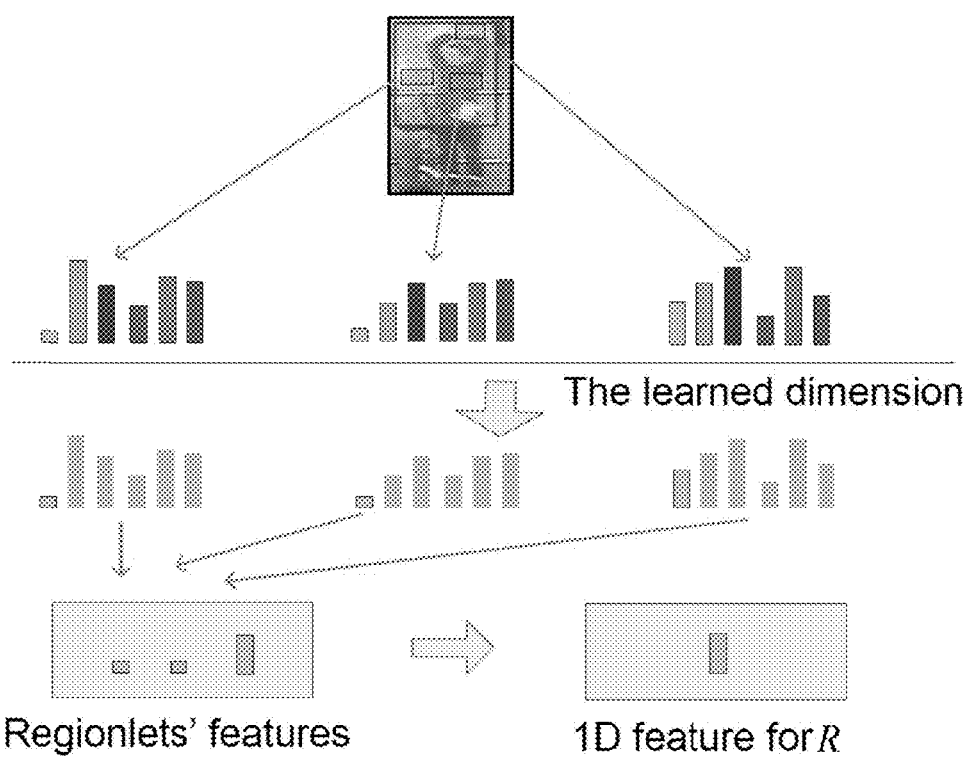
FIG. 3 shows an example of regionlet-based feature extraction.

FIG. 3 illustrates the process to extract T (R), the 1-D feature for a region R. Here we again use the example in FIG. 2, where the blue region R is the one covering the variation of hand locations. Assuming the first dimension of the concatenated low-level features is the most distinctive feature dimension learned for hand, we collect this dimension from all the three regionlets and represent T (R) by the strongest feature response from the top regionlet.

The proposed regionlet representations are evaluated on the candidate bounding boxes derived from selective search approach. In principle, they are also applicable for sliding windows. The selective search approach first over-segments an images into superpixels, and then the superpixel are grouped in a bottom-up manner to propose some candidate bounding boxes. This approach typically produces 1000 to 2000 candidate bounding boxes for an object detector to evaluate on, compared to millions of windows in an exhaustive sliding window search.

Figure 4:
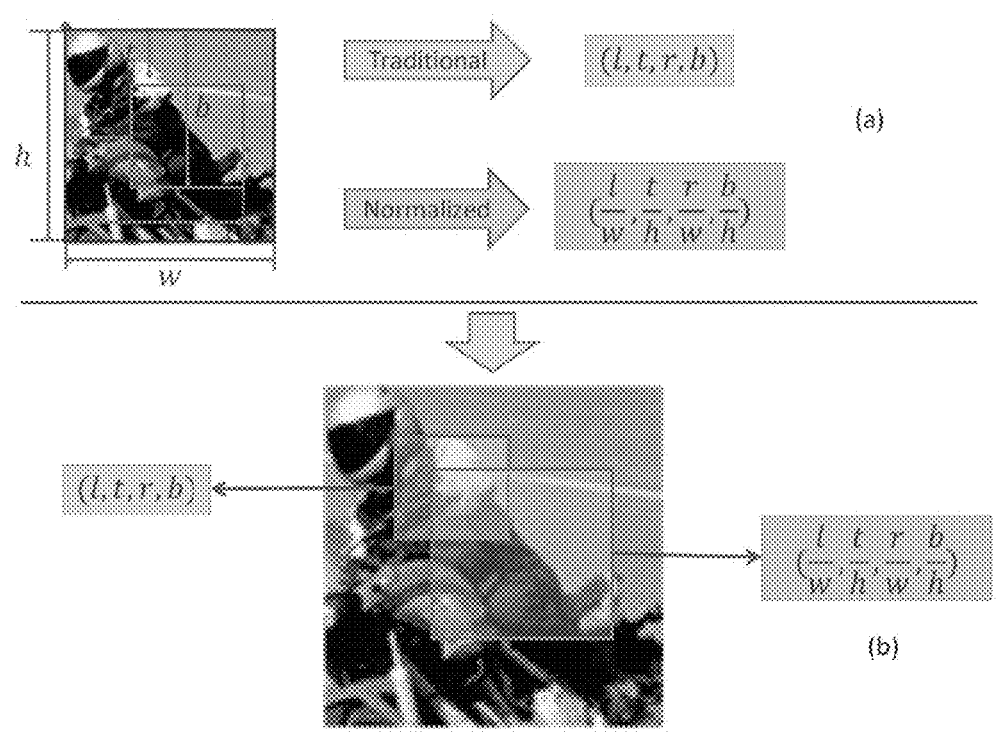
FIG. 4 shows an exemplary relative regions normalized by a candidate window that are robust to scale and aspect ratio changes.

However, these proposed bounding boxes have arbitrary sizes and aspect ratios. As a result, it is not feasible to use template regions (or template regionlets) with fixed absolute sizes that are widely used in sliding window search. We address this difficulty by using the relative positions and sizes of the regionlets and their groups to an object bounding box. FIG. 4 shows our way of defining regionlets in contrast to fixed regions with absolute sizes. When using a sliding window search, a feature extraction region is often defined by the top-left (l, t) and the bottom-right corner (r,b) w.r.t. the anchor position of the candidate bounding box. In contrast, our approach normalizes the coordinates by the width w and height h of the box and records the relative position of a region $$(l', t', r', b') = \left(\frac{l}{w}, \frac{t}{h}, \frac{r}{w}, \frac{b}{h}\right) = R'.$$

These relative region definitions allow us to directly evaluate the regionlets-based representation on candidate windows at different sizes and aspect ratios without scaling images into multiple resolutions or using multiples components for enumerating possible aspect ratios. FIG. 4 shows an exemplary relative regions normalized by a candidate window that are robust to scale and aspect ratio changes.

Next the process of learning the object detection model is discussed. The boosting framework is then used to learn the discriminative regionlet groups and their configurations from a huge pool of candidate regions and regionlets.

Deformation may occur at different scales. For instance, in person detection, deformation can be caused by a moving finger or a waving hand. A set of small regionlets that is effective to capture finger-level deformation may hardly handle deformation caused by hand movements. In order to deal with diverse variations, we build a largely over-complete pool for regions and regionlets with various positions, aspect ratios, and sizes. Before regionlet learning, a region R' or a regionlet r' are not applied to a detection window yet, so we call R' a feature region prototype and r' a regionlet prototype.

We first explain how the pool of region feature prototypes is constructed. We denote the 1D feature of a region relative to a bounding box as R'=(l',t',r',b',k) where k denotes the kth element of the low-level feature vector of the region. R' represents a feature prototype. The region pool is spanned by X×Y×W×H×F, where X and Y are respectively the space of horizontal and vertical anchor position of R in the detection window, W and H are the width and height of the feature extraction region R', and F is the space of low-level feature vector (e.g., the concatenation of HOG and LBP). Enumerating all possible regions is impractical and not necessary. We employ a sampling process to reduce the pool size. Algorithm 3.2.1 describes how we sample multiple region feature prototypes. In our implementation, we generate about 100 million feature prototypes.

Afterwards, we propose a set of regionlets with random positions inside each region. Although the sizes of regionlets in a region could be arbitrary in general, we restrict regionlets in a group to have the identical size because our regionlets are designed to capture the same appearance in different possible locations due to deformation. The sizes of regionlets in different groups could be different. A region may contain up to 5 regionlets in our implementation.

---

Algorithm 1: Generation of region feature prototypes

Input: Region width step $\delta_w$ and height step $\delta_h$;
maximum width W and height H of region
prototypes; horizontal step $p_x$ and vertical step
$p_y$ for the region anchor position; minimum
width $w_{min}$ and height $h_{min}$ of region
prototypes; the number of features N to extract
from one region 1 begin
2 | w ← $w_{min}$, h ← $h_{min}$, i ← 0
3 | for w < W do
4 | | h ← $h_{min}$
5 | | for h < H do
6 | | | h ← h + $\delta_h$
7 | | | l ← 0, t ← 0
8 | | | for l < W – w do
9 | | | | t ← 0
10 | | | | for t < H – h do
11 | | | | | for k=1,... N do
12 | | | | | | r ← l + w, b ← t + h
| | | | | | R' = (l/w, t/h, r/w, b/h, k)
| | | | | | $\mathcal{R} \leftarrow \mathcal{R} \cup \{R'\}$
13 | | | | | t ← t + $p_y$, i ← i + 1
14 | | | | l ← l + $p_x$
15 | | | h ← h + $\delta_h$
16 | | w ← w + $\delta_w$ Output: Region feature prototype pool R

---

So the final feature space used as the feature pool for boosting is spanned by R×C, where R is the region feature prototype space, C is the configuration space of regionlets. Therefore, we augment a region feature prototype R'=(l',t',r', b', k,c) with a regionlet configuration c.

Training with boosting regionlet features is discussed next. We use RealBoost to train cascaded classifiers for our object detector. One boosting classifer consists of a set of selected weak classifiers. We define the weak classifier using a lookup table:

$$h(x) = \sum_{o=1}^{n-1} v^o 1(B(x) = o), \quad (3)$$

where h(x) is a piece-wise linear function defined by a lookup table, $v^o$ is the table value for the oth entry, B(x) quantizes the feature value x into a table entry, and 1(•) is an indicator function. In each round of the training, $v^o$ is computed based on the sample weight distribution as $$v^o = \frac{1}{2}\ln\left(\frac{U_+^o}{U_-^o}\right),$$

where $U_+^o$ is the summation of the weights of the positive examples whose feature values fall into the oth entry of the table. The $U_-^o$ is defined in a similar manner for the weights of negative examples.

Let's denote Q as a candidate bounding box, R'(Q) as a rectangular region in Q, and T(R'(Q)) as the one-dimensional feature computed on R'(Q) (similar notation as in Eq. 1). Substituting x in Eq. 3 with the extracted feature, we can get the weak classifier in the tth round of training for the bounding box Q:

$$h_t(T(R'(Q))) = \sum_{o=1}^{n-1} v_t^o 1(B_t(T(R'(Q))) = o), \quad (4)$$

where $v_t^o$ is the table value of the oth entry at the tth round of training. Then, for each boosting classifier, the learning process obtains a set of weak classifiers H for separating the positive samples from negative ones:

$$H(Q) = \sum_{t=1}^{T} \beta_t h_t(T(R'_{i_t}(Q))) \quad (5)$$
$$= \sum_{t=1}^{T} \beta_t h_t\left(\sum_{j=1}^{N_{i_t}} \alpha_{i_t,j} T(r'_{i_t,j}(Q))\right),$$

where $i_t$ is the index of the region selected in the tth round of training, $N_{i_t}$ is the total number of regionlets in $R_{i_t}$, and $\beta_t$ is the weight of the selected weak classifier. The classification result of the candidate bounding box Q is determined by the final round of cascade if it passes all previous ones, and it is expressed as f(Q)=sign(H*(Q)) where H* denotes the last stage of cascade.

In each cascade training, we generate 100 millions of candidate weak classifiers. To feed into memory, a reduced set of 20K weak classifiers are sampled uniformly. The training terminates once the error rates (37.5% for negative and 1% for positive samples) are achieved except the last cascade. The last round stops until it collects 5K weak classifiers. The training results in 6-7 cascades and 5K-6K weak classifiers.

Given a test image, we determine a number of candidate bounding boxes using the selective search. Then, each candidate bounding box is passed along the cascaded classifiers learned in the boosting process. Because of early rejections, only a small number of candidate bounding boxes reach the last stage of the cascade. Therefore, except the time spent on proposing bounding boxes, our method yields a very fast testing speed.

Figure 5:
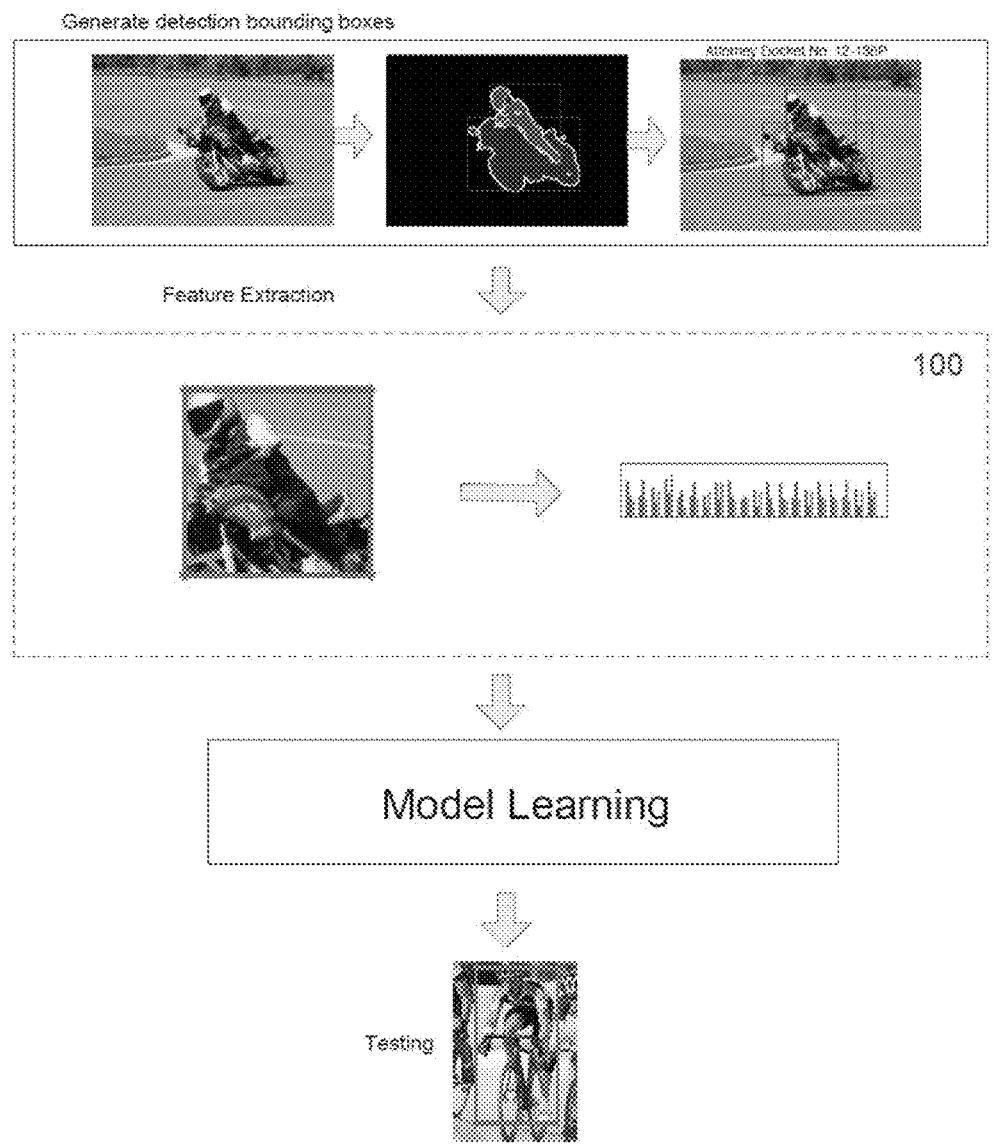
FIG. 5 shows an exemplary process for applying regionlets for generic object detection.

FIG. 5 shows an exemplary process for applying regionlets for generic object detection. The embodiment of FIG. 5 models an object class by a cascaded boosting classifier which integrates various types of features from competing local regions, named as regionlets. A regionlet is a base feature extraction region defined proportionally to a detection window at an arbitrary resolution (i.e. size and aspect ratio). These regionlets are organized in small groups with stable relative positions to delineate fine-grained spatial layouts inside objects. Their features are aggregated to a one-dimensional feature within one group so as to tolerate deformations. Then we evaluate the object bounding box proposal in selective search from segmentation cues, limiting the evaluation locations to thousands. Our approach significantly outperforms the state-of-the-art on popular multi-class detection benchmark datasets with a single method, without any contexts. It achieves the detection mean average precision of 41.7% on the PASCAL VOC 2007 dataset and 39.7% on the VOC 2010 for 20 object categories. It achieves 14.7% mean average precision on the ImageNet dataset for 200 object categories, outperforming the latest deformable part-based model (DPM) by 4.7%.

The system of FIG. 5 uses a new object representation strategy for generic object detection, which incorporates adaptive deformation handling into both object classifier learning and basic feature extraction. Each object bounding box is classified by a cascaded boosting classifier, where each weak classifier takes the feature response of a region inside the bounding box as its input and then the region is in turn represented by a group of small sub-regions, named as regionlets. The sets of regionlets are selected from a huge pool of candidate regionlet groups by boosting. On one hand, the relative spatial positions of the regionlets within a region and the region within an object bounding box are stable. Therefore, the regionlet representation can model fine-grained spatial appearance layouts. On the other hand, the feature responses of regionlets within one group are aggregated to a one dimensional feature, and the resulting feature is generally robust to local deformation. Also, our regionlet model is designed to be flexible to take bounding boxes with different sizes and aspect ratios. Therefore our approach is ready to utilizes the selective search strategy to evaluate on merely thousands of candidate bounding boxes rather than hundreds of thousands (if not millions) of sliding windows as in the exhaustive search.

The system offers a number of advantages: 1) It introduces the regionlet concept which is flexible to extract features from arbitrary bounding boxes. 2) The regionlet-based representation for an object class, which not only models relative spatial layouts inside an object but also accommodates variations especially deformations by the regionlet group selection in boosting and the aggregation of feature responses in a regionlet group. As validated in the experiment, the proposed representation adaptively models a varying degree of deformation in diverse object classes. In this manner, regionlets provide a radically different way to model object deformation compared to existing BoW approaches with selective search and DPM approaches. Our regionlet model can well adapt itself for detecting rigid objects, objects with small local deformations as well as long-range deformations. Validated on the challenging PASCAL VOC datasets and ImageNet object detection dataset, the proposed regionlet approach demonstrates superior performance compared to the existing approaches. We contemplate using bounding boxes in term of recall and speed. We also contemplate that context information can be integrated into the boosting learning process for further improving detection performance.

Figure 6:
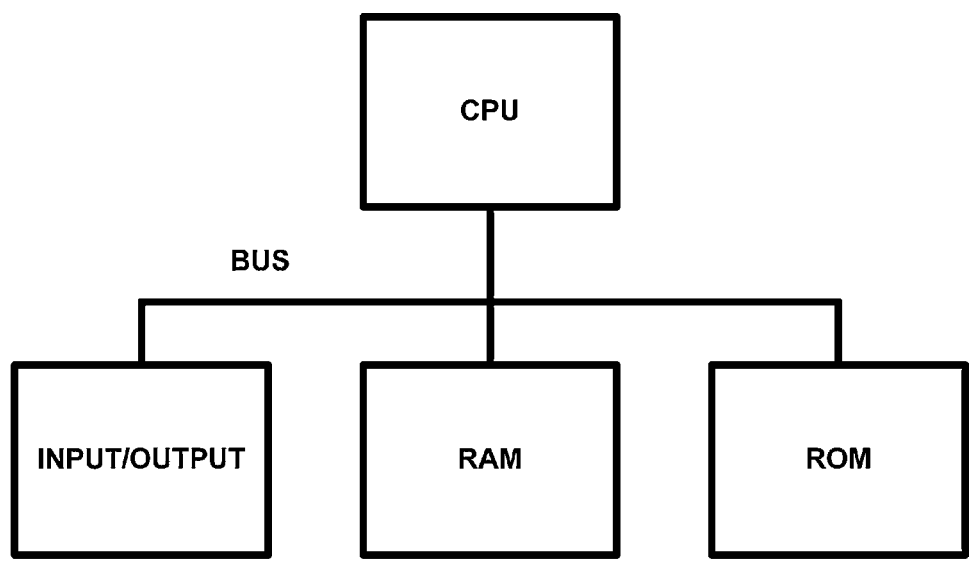
FIG. 6 shows an exemplary computer to execute FIGS. 1-5.

The invention may be implemented in hardware, firmware or software, or a combination of the three. FIG. 6 shows an exemplary computer to execute FIGS. 1-5. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for object detection, comprising:
receiving an image and extracting features therefrom;
   applying a learning process to determine sub-regions and select predetermined pooling regions;
performing selective max-pooling to choose one or more feature regions without noises,
forming at least an object bounding box for a location;
applying a cascaded boosting classifier to each object bounding box, with each weak classifier taking a feature response of a region inside the bounding box as its input and then the region is in turn represented by a group of small sub-regions (regionlets), and
determining a permutation invariant feature operation on features extracted from regionlets as $$T(R) = \sum_{j=1}^{N_R} \alpha_j T(r_j),$$

$$\text{subject to } \alpha_j \in \{0, 1\}, \sum_{j=1}^{N_R} \alpha_j = 1$$

where T(R) as a feature representation for region R, T($r_j$) as a feature extracted from the $j^{th}$ regionlet $r_j$ in R, $N_R$ is a total number of regionlets in region R, $\alpha_j$ is a binary variable, either 0 or 1.

2. The method of claim 1, comprising counting features appearing in candidate sub-regions.

3. The method of claim 1, comprising selecting sets of regionlets from a pool of candidate regionlet groups by boosting.

4. The method of claim 1, comprising using a regionlet representation to model fine-grained spatial appearance layouts.

5. The method of claim 1, comprising aggregating feature responses of regionlets within one group to a one dimensional feature robust to local deformation.

6. The method of claim 1, comprising applying max-pooling over regionlet features as:

$$T(R) = \max_j T(r_j).$$

7. The method of claim 1, comprising normalizing regionlets using detection windows.

8. The method of claim 1, comprising normalizing regionlets by by using relative positions and sizes of the regionlets and their groups to an object bounding box.

9. The method of claim 1, comprising training with boosting regionlet features.

10. The method of claim 1, comprising using RealBoost to train cascaded classifiers for object detection.

11. A system for object detection, comprising:
a camera;
a processor coupled to the camera;
code for receiving an image and extracting features therefrom;
applying a learning process to determine sub-regions and select predetermined pooling regions; and
performing selective max-pooling to choose one or more feature regions without noises,
forming at least an object bounding box for a location;
applying a cascaded boosting classifier to each object bounding box, with each weak classifier taking a feature response of a region inside the bounding box as its input and then the region is in turn represented by a group of small sub-regions (regionlets), and
determining a permutation invariant feature operation on features extracted from regionlets as $$T(R) = \sum_{j=1}^{N_R} \alpha_j T(r_j),$$

$$\text{subject to } \alpha_j \in \{0, 1\}, \sum_{j=1}^{N_R} \alpha_j = 1$$

where T(R) as a feature representation for region R, T($r_j$) as a feature extracted from the $j^{th}$ regionlet $r_j$ R, $N_R$ is a total number of regionlets in region R, $\alpha_j$ is a binary variable, either 0 or 1.

12. The system of claim 11, comprising code for counting features appearing in candidate sub-regions.

13. The system of claim 11, comprising code for selecting sets of regionlets from a pool of candidate regionlet groups by boosting.

14. The system of claim 11, comprising code for using a regionlet representation to model fine-grained spatial appearance layouts.

15. The system of claim 11, comprising RealBoost code to train cascaded classifiers for object detection.

* * * * *